(12) United States Patent
Klinkman et al.

(10) Patent No.: US 7,377,674 B2
(45) Date of Patent: May 27, 2008

(54) LOW PROFILE LIGHT FOR ARTICLE CARRIER SYSTEM

(75) Inventors: John E. Klinkman, Riley Township, MI (US); Winston Fowler, Northville, MI (US); Robert H. Miller, Canton, MI (US); Timothy A. Danczuk, Riley Township, MI (US); Robert E. Burnham, Novi, MI (US); William R. Henderson, New Baltimore, MI (US); Ronald G. Saward, Shelby Township, MI (US)

(73) Assignee: Advanced Accessory Systems, LLC, Sterling Heights, MI (US)

( * ) Notice: Subject to any disclaimer, the term of this patent is extended or adjusted under 35 U.S.C. 154(b) by 0 days.

(21) Appl. No.: 11/589,620

(22) Filed: Oct. 30, 2006
(Under 37 CFR 1.47)

(65) Prior Publication Data
US 2007/0217212 A1 Sep. 20, 2007

Related U.S. Application Data

(60) Provisional application No. 60/731,304, filed on Oct. 28, 2005.

(51) Int. Cl.
*B60Q 1/00* (2006.01)

(52) U.S. Cl. .................. 362/484; 382/294; 382/480
(58) Field of Classification Search ............... 362/480, 362/484, 294, 373, 547, 345
See application file for complete search history.

(56) References Cited

U.S. PATENT DOCUMENTS

| | | | |
|---|---|---|---|
| 6,390,913 B1* | 5/2002 | Wieschermann et al. | ... 454/108 |
| 6,637,806 B2* | 10/2003 | Kazama | ... 296/180.1 |
| 6,953,261 B1* | 10/2005 | Jiao et al. | ... 362/217 |
| 7,261,446 B2* | 8/2007 | Thomas | ... 362/459 |
| 7,303,320 B1* | 12/2007 | Ashley | ... 362/493 |
| 2006/0120095 A1* | 6/2006 | Lin | ... 362/523 |

* cited by examiner

*Primary Examiner*—Ali Alavi
(74) *Attorney, Agent, or Firm*—Rader, Fishman & Grauer PLLC

(57) ABSTRACT

An article carrier apparatus for a vehicle includes a cross rail interconnected to an exterior surface of the vehicle, a heat sink positioned within the cross rail, and a light source positioned within the cross rail. The light source is thermally connected to the heat sink such that the heat sink will absorb at least a portion of the heat generated by operation of the light source. The cross rail will structurally support an article attached to the exterior of a vehicle.

20 Claims, 10 Drawing Sheets

US 7,377,674 B2

LOW PROFILE LIGHT FOR ARTICLE CARRIER SYSTEM

CROSS REFERENCE TO RELATED APPLICATIONS

This application claims priority to U.S. Provisional Patent Application 60/731,304, filed Oct. 28, 2005, which is incorporated by reference in its entirety.

TECHNICAL FIELD

The embodiments described herein are generally directed to marker lights for vehicles.

BACKGROUND

A vehicle may include one or more spot lights or marker lights to illuminate exterior vehicle portions. A vehicle may also include an article carrier rack to strap luggage or secure articles, such as bicycles or kayaks, to an exterior portion of the vehicle. Typically, light bars or spot lights interfere with article carrier racks since both are designed to occupy the same space.

BRIEF DESCRIPTION OF THE DRAWINGS

Referring now to the drawings, preferred illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are not intended to be exhaustive or otherwise limit or restrict the claims to the precise forms and configurations shown in the drawings and disclosed in the following detailed description.

DETAILED DESCRIPTION

Figure 1:
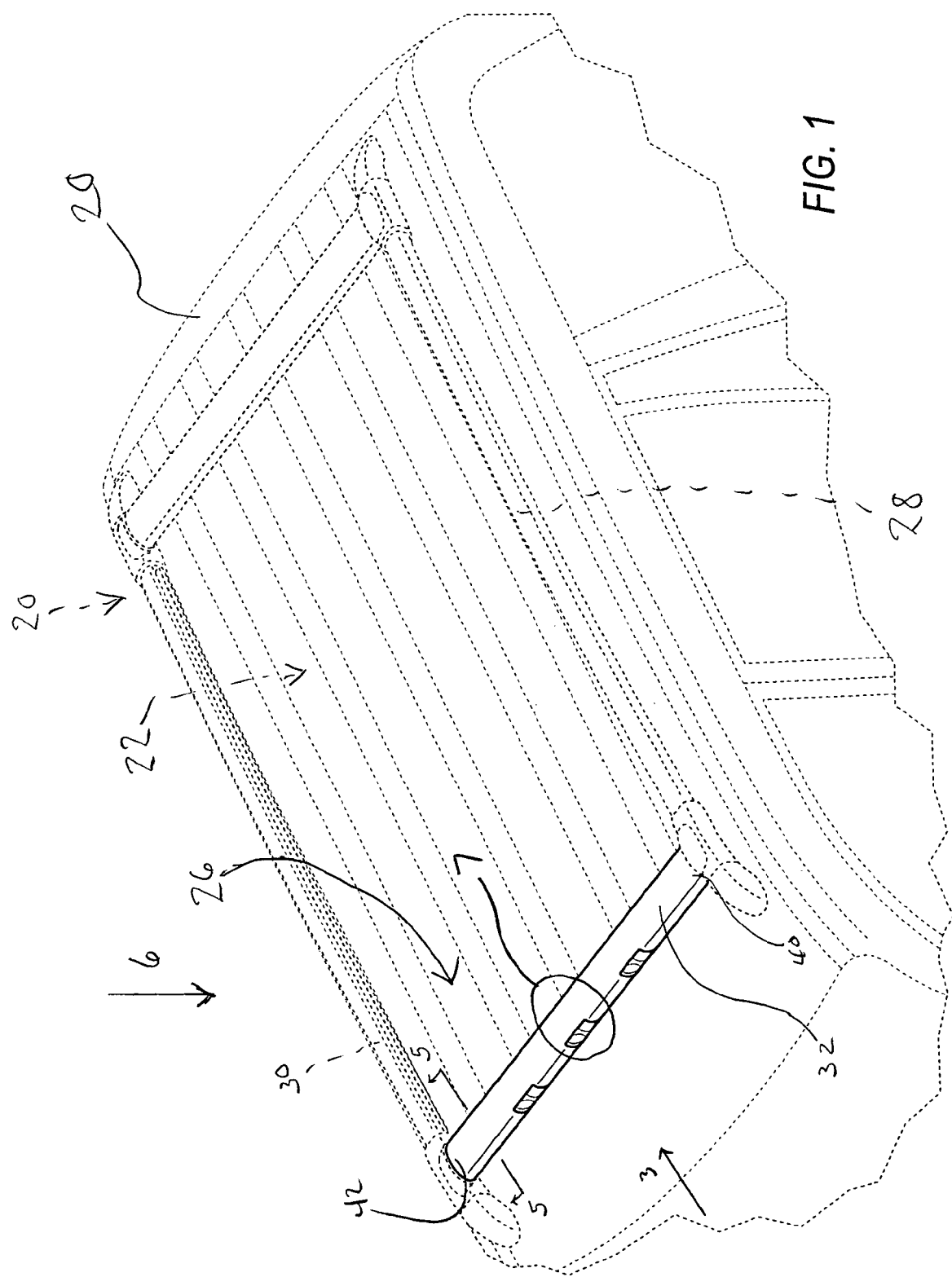
FIG. 1 is a perspective view of a low profile light assembly, according to an embodiment.

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limit or restrict the invention to the precise form and configuration shown in the drawings and disclosed in the following detailed description.

Referring to FIGS. 1-6, a vehicle 20 is illustrated. The vehicle 20 includes an exterior surface 22 having a low profile light assembly 26 mounted thereto. The assembly 26 includes a first side rail 28, a second side rail 30, and a cross rail, or light bar, 32 extending therebetween.

The low profile light assembly 26 includes a tubular housing 38 designed to be aerodynamic adjacent any exterior surface 22 of the vehicle 20. The housing 38 includes a first end 40, a second end 42, an inside surface 44, an outside surface 46, and a plurality of openings 50. The openings 50 are sized to accept lamps, or light sources, 52, such as spotlights, markers, and the like.

The low profile light assembly 26 provides adequate space in the housing 38 for a high powered light, such as a high powered light emitting diode (LED) 58, while providing enough strength to support articles placed on or attached to the low profile light assembly 26.

Figure 2:
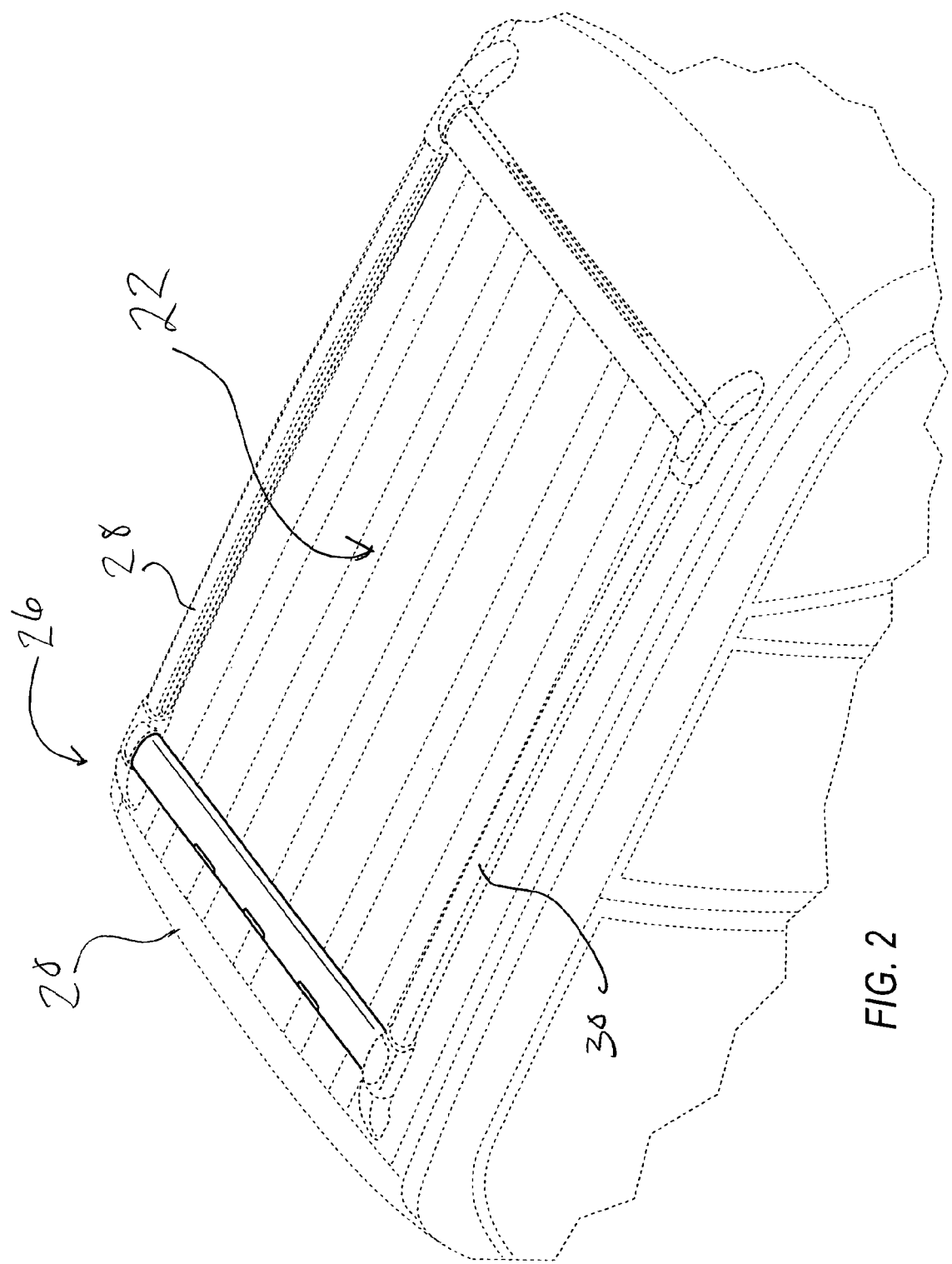
FIG. 2 is a perspective view of an embodiment of the low profile light assembly of FIG. 1, taken from a different perspective as FIG. 1 and with the assembly located on a different portion of a vehicle.
Figure 3:
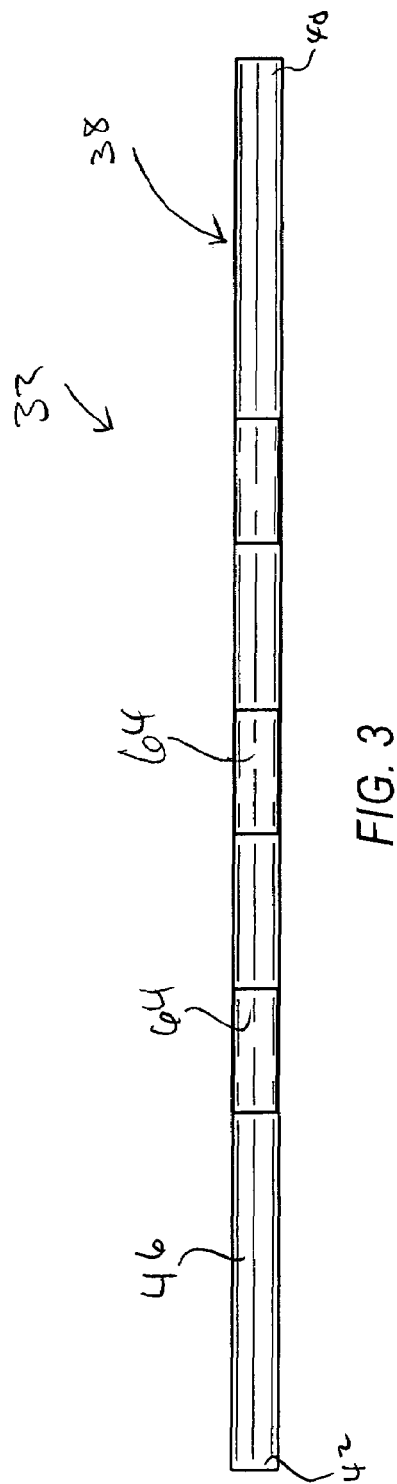
FIG. 3 is a front view of the assembly of FIG. 1, taken along line 3 of FIG. 1.
Figure 4:
FIG. 4 is a rear view of the assembly of FIG. 1, taken along line 4 of FIG. 1.
Figure 5:
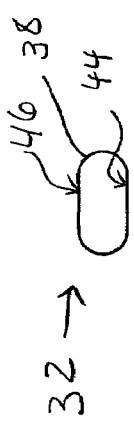
FIG. 5 is a front view of the assembly of FIG. 1, taken along line 5-5 of FIG. 1.
Figure 6:
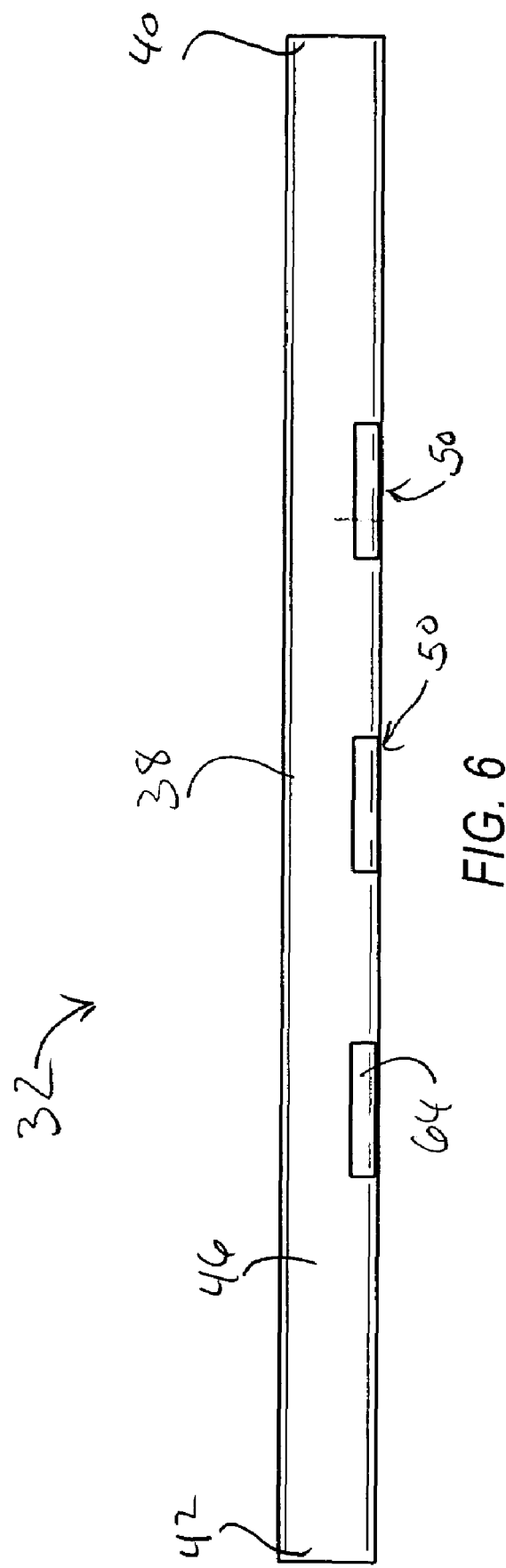
FIG. 6 is a top view of the assembly of FIG. 1, taken along line 6 of FIG. 1.

The openings 50 shown in FIGS. 2, 3, and 5 permit light generated by the light sources 52 to emit from the housing 38. In the embodiment illustrated, the housing 38 also includes a cover 64 in the front surface 70, positioned so as to cover openings 50. In the embodiment illustrated, the cover 64 is transparent, although other covers may be used. In one embodiment, the heat sink 54, with lamps 52 attached, is inserted into an end of the housing 38. By dissipating heat, the heat sink 54 provides a thermal protection for the housing 38 and lamps 52 to prevent undesired heat affects to the lamps 52 and to the housing 38.

A gasket (not shown), may be provided to seal the cover 64 to the housing 38. The gasket 64 may be made of rubber, silicon, or other suitable sealing material, to aid in preventing undesired water intrusion between the cover 64 and the housing 38 that may corrode the electric system of the light source 52 or enter the passenger compartment at locations where the low profile light assembly 26 is secured to vehicle 20.

Figure 7:
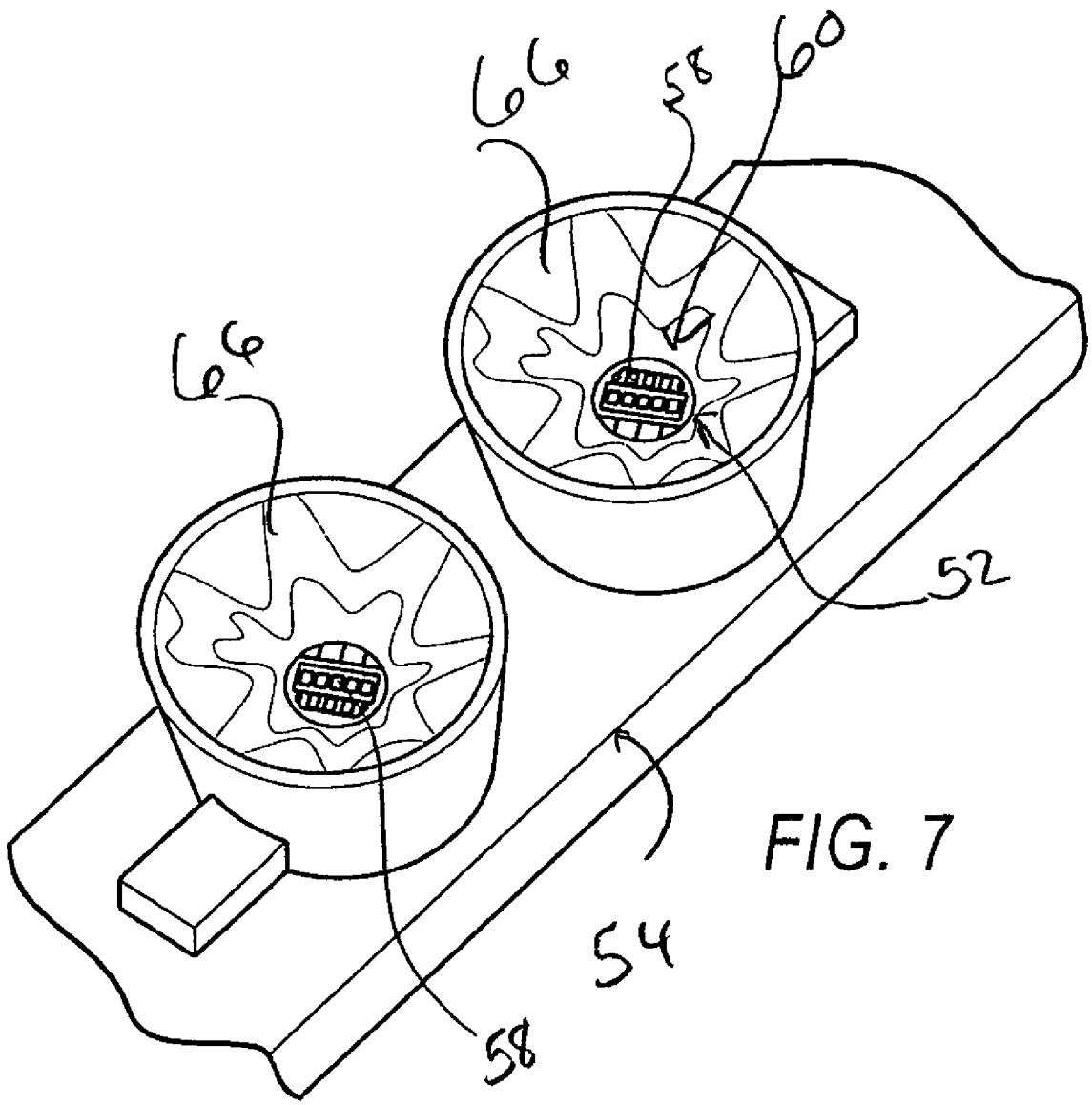
FIG. 7 is a perspective view of an interior portion of the assembly of FIG. 1 taken at area 7 of FIG. 1, illustrating LED lights mounted on a heat sink.

Referring now to FIG. 7, an embodiment of the light source 52 for the low profile light assembly 26 is an LED assembly 60. The LED assembly 60 includes eight LEDs 58. Radiation of light emitted by each LED 58 is directed by a reflector 66. Each reflector 66 houses a LED assembly 60, and each opening 50 has a pair of reflectors 66 aligned thereto so as to reflect the light generated through the openings 50.

The LED assembly 60 is a high power type providing at least 380 lumens of light per LED 58. As illustrated in FIG. 7, the LED assembly 60 has 8 LEDs 58 for a total output of 3040 lumens (8×380) for each lamp 52. As illustrated in FIG. 1, the light assembly 26 would have an output of at lest 18,240 lumens (6×3040). In other embodiment, the light bar 32 has an output of about 5000 lumens or about 15,000 lumens, and the heat sink 54 is sized accordingly so as to dissipate a sufficient amount of heat to prevent damage to the components of the assembly 26. Accordingly, the light assembly 26 includes forty-eight LEDs 58 (6×8). The heat output from a number of high output LEDs positioned within a relatively small, sealed housing 38 will generally require a heat sink, such as the heat sink 54 to prevent overheating of components of the light assembly 26.

In the embodiment illustrated, the reflector 66 is generally parabolic in shape, although the reflector 66 can be ellipsoidal in shape or any other shape in order to desirably direct the radiation of light from the LEDs 58 onto a target (not shown) that is a finite distance from the light assembly 26. Other reflector shapes may be found usable whether or not such alternative reflector shapes are theoretically ideal for the purpose. As discussed in more detail with respect to other embodiments, below, a key advantage of the system is that any electrical connections or wiring are both hidden from casual view and protected from the environmental conditions experienced by vehicles in operation. Other light sources including halogen or incandescent lights may be used under some circumstances. Advantages typically associated with LED lights, however, include (i) high light output to low power consumption ratio and (ii) very compact design.

Figure 13:
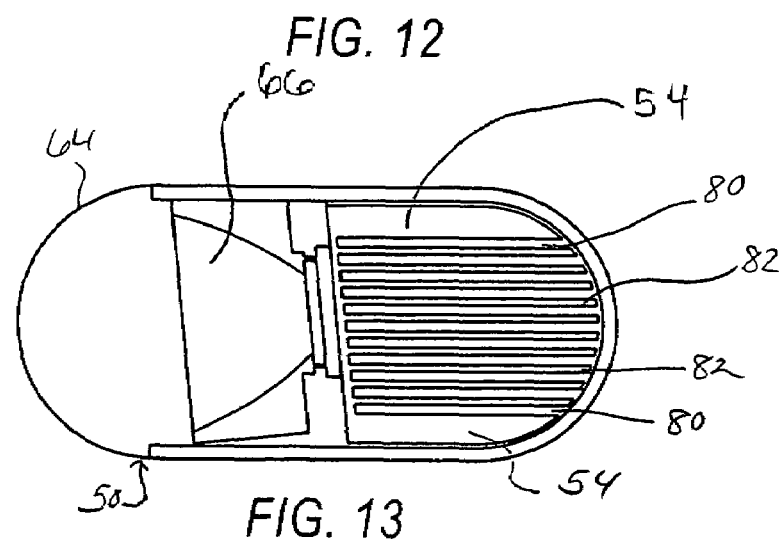
FIG. 13 is a sectional view of a low profile light assembly, according to an embodiment, taken along line 13-13 in FIG. 8.
Figure 14:
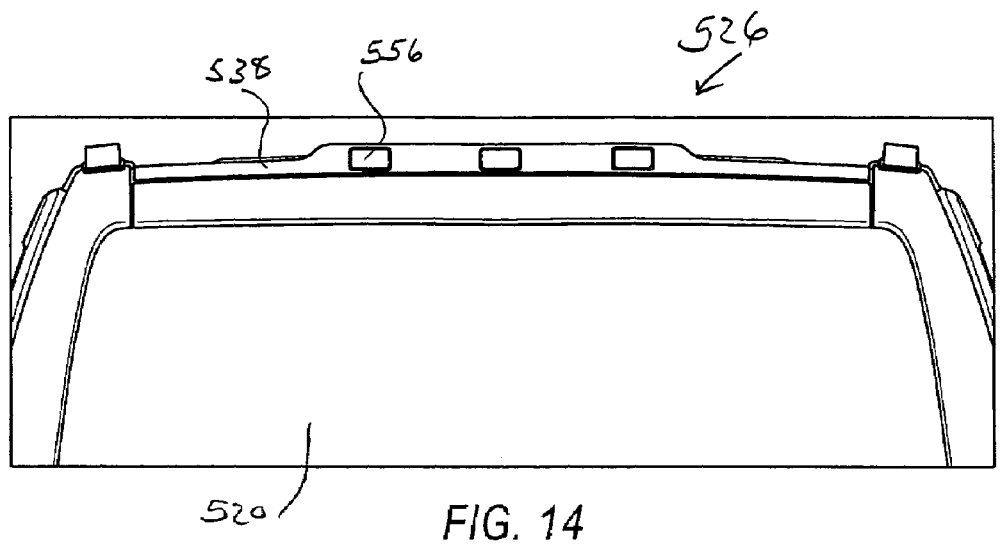
FIG. 14 is a rear view of an assembly according to an embodiment.
Figure 15:
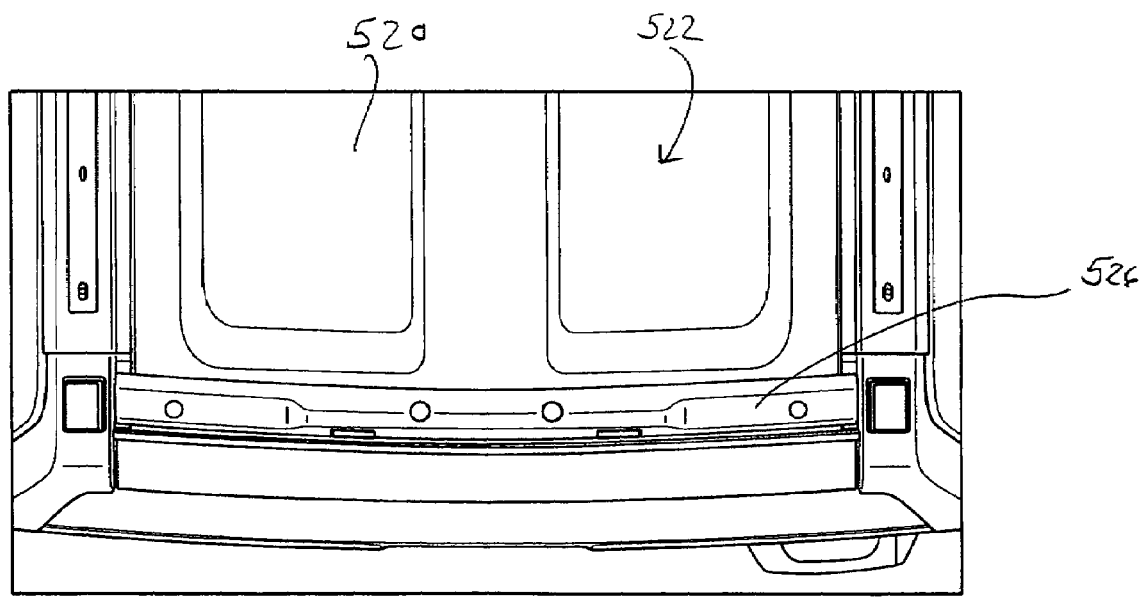
FIG. 15 is a top view of the assembly of FIG. 14.
Figure 16:
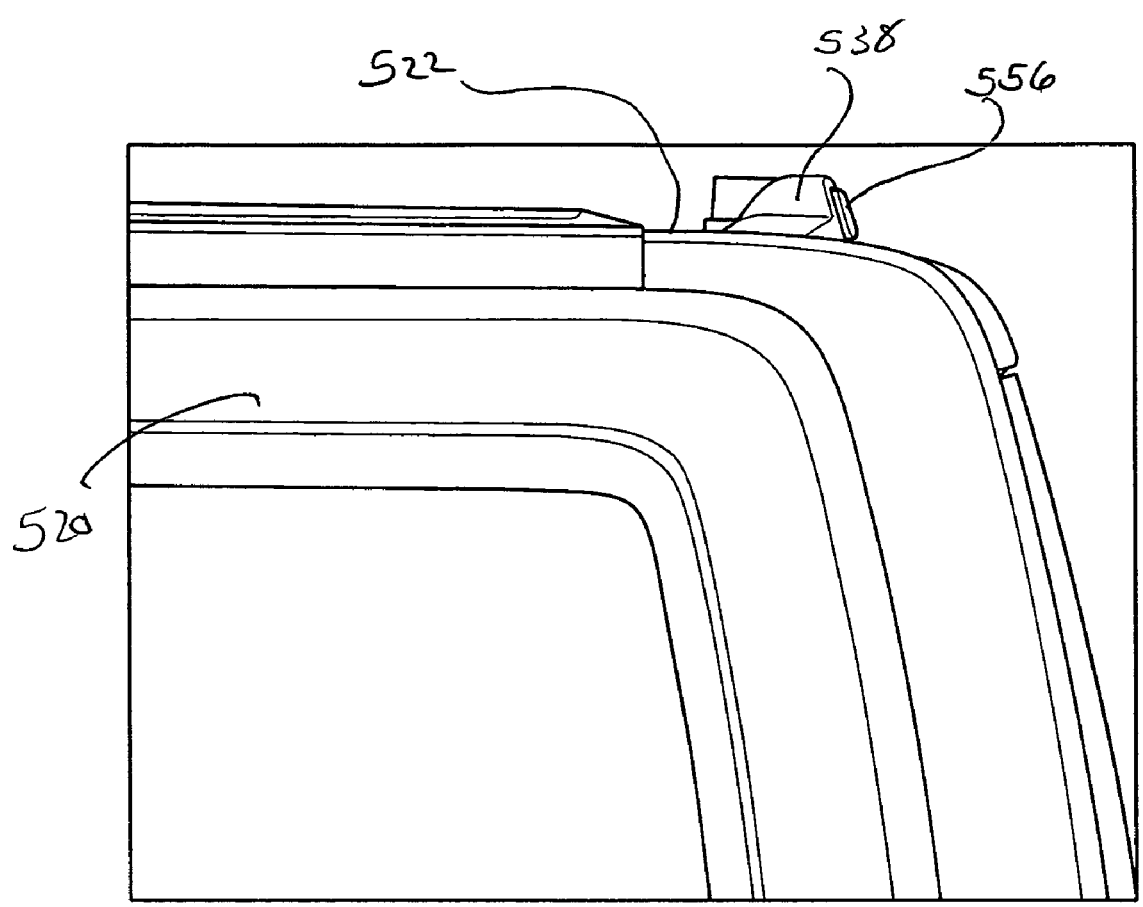
FIG. 16 is a side view of the assembly of FIG. 14.
Figure 17:
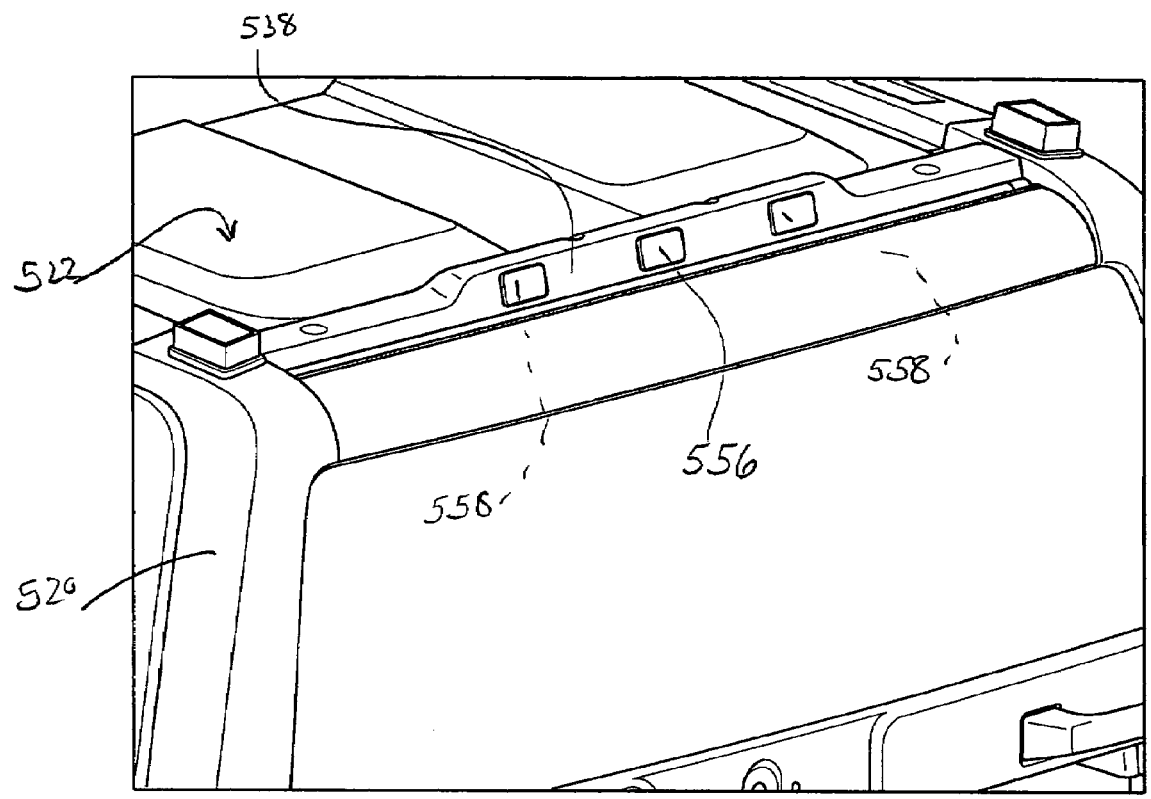
FIG. 17 is a side, top, rear perspective view of the assembly of FIG. 14.
Figure 18:
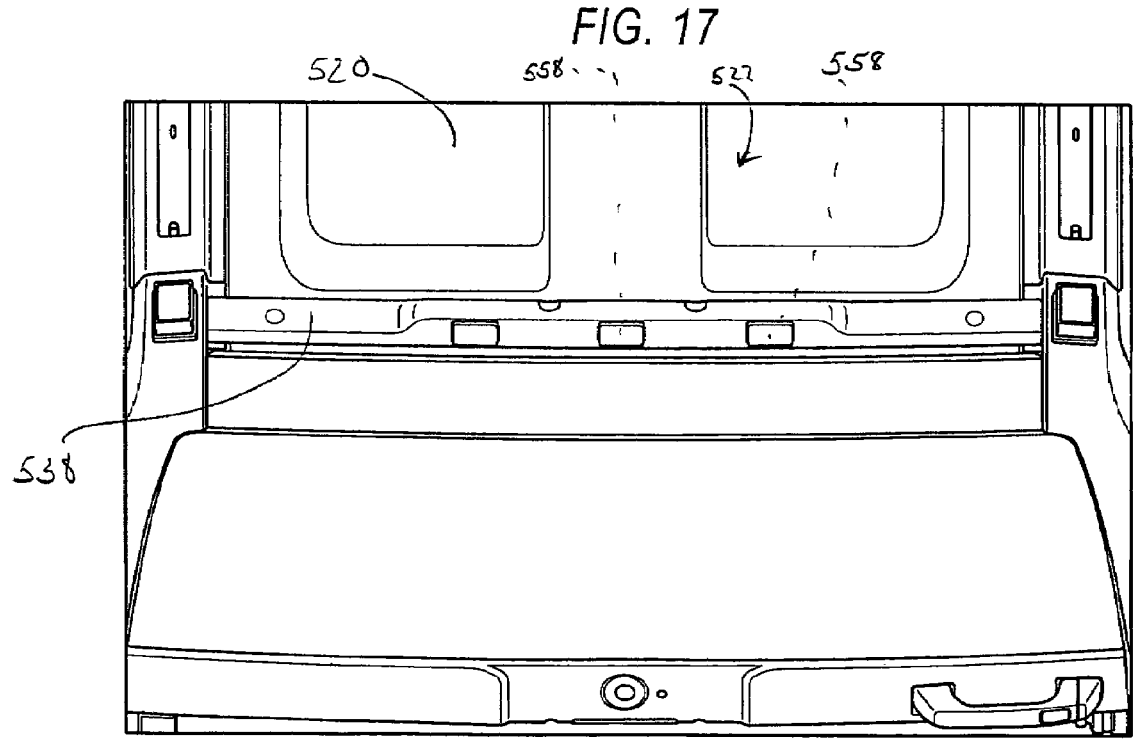
FIG. 18 is a top, rear perspective view of the assembly of FIG. 14.

The reflectors 66 are integrated into a heat sink 54. The integrated heat sink 54 provides dissipation of heat from the light source 52. In the embodiments illustrated in FIGS. 7 and 13, both the LEDs 58 and the reflector 66 are integrated into (thermally connected) the heat sink 54 for maximizing heat dissipation. Furthermore, a thermo grease and the like (not shown) may be used around the heat sink to further dissipate heat. Moreover, slots 80 (FIG. 13) formed in the heat sink 54 to segregate a portion of the heat sink 54 into a plurality of extending fins 82 may be used to even further dissipate heat. The LEDs 58 are tuned to perform as a single spotlight. That is, the proximity of the LEDs relative to one another give the appearance that the light source 52 is a single integrated light.

The heat sink 54 may span within the housing 38 from the first end 40 to the second end 42, as desired, to provide for sufficient heat dissipation for the heat generated by the operation of the lamps 52. The heat sink 54 may take on the internal shape of the housing 38 in order to provide for enhanced thermal transfer between the heat sink 54 and the housing 38. The surface of the heat sink 54 may be coarsely sandblasted to make it more porous and increase the surface area for further heat dissipation. When installed inside the housing 38, a thermal grease may be applied to contacting surfaces of the housing 38 and the heat sink 54 to further aid in the heat transfer from the heat sink 54 to the housing 38. A fastener (not shown) may be applied to increase pressure between the heat sink 54 and the housing 38 to further promote thermal transfer therebetween. The housing 38 may also be formed from aluminum to further provide heat dissipation since aluminum conducts heat better and the entire housing 38 would provide additional heat dissipation. Furthermore, anodizing the housing 38 may also increase the thermal efficiency.

In one embodiment, the LEDs 58 and the reflector 66 are glued to heat sink 54 with a thermally conductive adhesive or epoxy (such as Artic Silver) that allows very efficient heat transfer from the LED 58 to the heat sink 54. When attached with a thermally conductive adhesive, such as Artic Silver, the heat sink may be referred t as being thermally connected to the reflector 66 and/or the LEDs 58. The heat sink 54 may be made from any material that efficiently dissipates heat including aluminum and the like. In the embodiment illustrated in FIG. 7, the heat sink 54 is aluminum, or at least has the minimum thermal characteristics (thermal conductivity, thermal diffusivity) as aluminum.

The low profile light assembly 26 may be mounted to the exterior surface 22 of the vehicle 20 through the use of bolts, screws, fasteners, rivet nuts, weld nuts, and the like. An advantage of the embodiment described over prior art light assemblies is that the low profile light assembly 26 is aerodynamically mounted to the exterior surface 22 of the vehicle 20 without having to mount typical lights to the vehicle exterior surface 22 providing an aerodynamic impact resistant feature. The wind will be directed up the windshield and over the top surface of the low profile light assembly 26 resulting in less upward and impact force on the low profile light assembly 26 and its fasteners.

The low profile light assembly 26 may be integrated with or a part of an article rack carrier 70 as shown in FIGS. 1-2. In one embodiment, light assembly 26 is integrated within a moveable cross rail, associated with opposing side rails generally perpendicular to the cross rail and extending along a generally longitudinal axis of a vehicle. As illustrated, each light assembly 26 is integrated into the structure of the cross rail in such a manner as to permit normal operation of the cross rail and its receipt of articles for transport. Thus, the cross rail is serving two functions at the same time. Moreover, by integrating light assembly 26 into a cross rail, electrical connectors in the cross rail are protected from the element and provide a pleasing appearance. In a preferred embodiment, the cross rail is able to move back and forth within the side rails as is known in the art.

Figure 8:
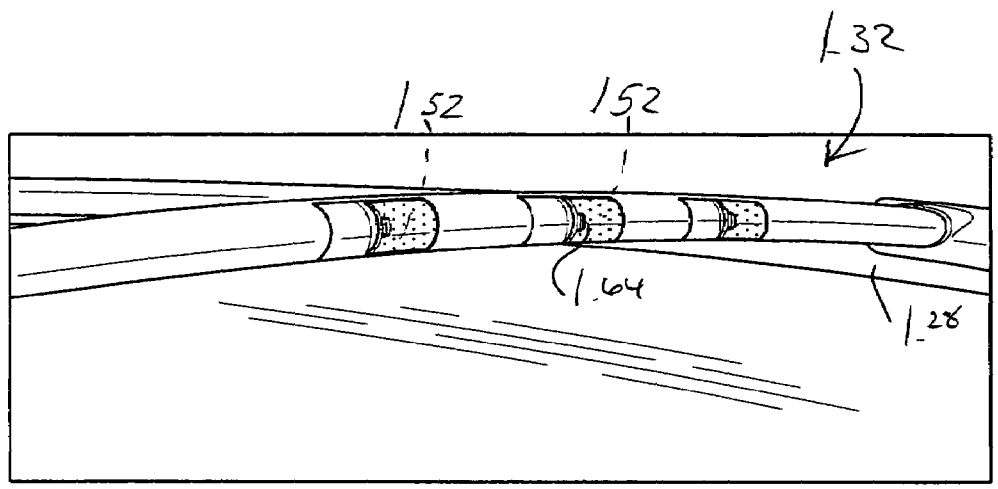
FIG. 8 is a perspective view of a low profile light assembly, according to an embodiment.

FIG. 8 illustrates a light bar assembly 126 with covers 164 slightly recessed into the housing 138. A blind 180 is slidable along the outer surface 146 of light assembly 126 from a recess 184 formed within the cross rail itself, as shown. A handle 188 promotes ready sliding of the blind 180 into and out of its recess 184. A key advantage of this approach is that the cover 180 may not be accidentally lost since it is not removed from the assembly 126.

Figure 9:
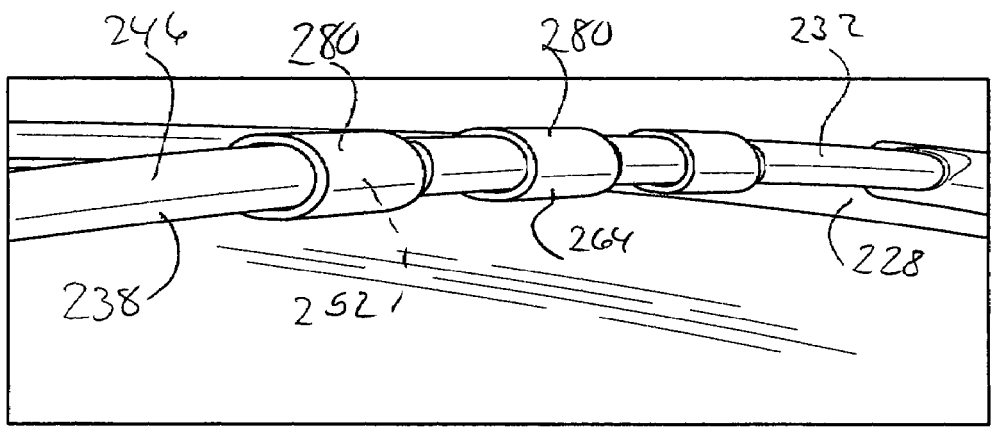
FIG. 9 is a perspective view of a low profile light assembly, according to an embodiment.

FIG. 9 illustrates a light bar assembly 226 having a glove or pad 280 circumscribing the outer surface 246 of the housing 38. The glove 280 is arranged to easily slide over covers 264 when the light sources 252 are desired to be covered and moved away from lights 226 when light usage is desired. In the embodiment illustrated, the gloves 280 include an additional function of providing a protective surface for items that may be placed on the cross rail of the article carrier. For example, if an article has a hard surface, it may be scratched when engaging an outer surface 246 of the light bar 232. The gloves 280 may be used to provide cushioning between the article and the cross rail. Thus, the gloves 280 may protect articles and the light bar 232. To use a light assembly 226 for illumination, the gloves 280 may be moved away from the light, while the article protecting function is maintained.

Figure 10:
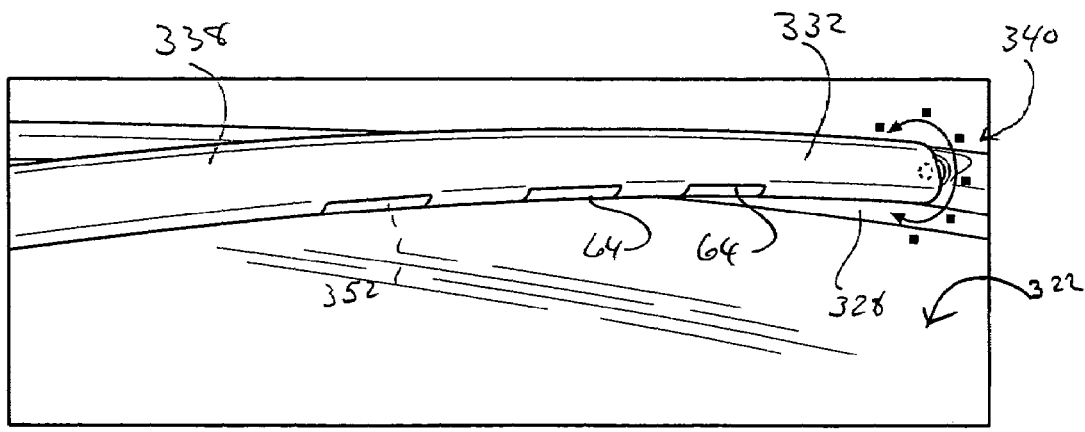
FIG. 10 is a perspective view of the low profile light assembly of FIG. 8, illustrated in a second configuration.

FIG. 10 illustrates a light assembly 326. The light assembly 326 includes a first rotational attachment 380 between the first end 340 and the first side rail 328, and a second rotational attachment (not shown) between the second end 342 and the second side rail 330. When the light assembly 326 is operated for illumination, the light bar 332 is pivoted to direct the lamps 52 such that the lamps 52 illuminate the direction of travel or the area where viewing is desired. When the light assembly 326 is not used for illumination, the light bar 332 may be pivoted so that lamps 52 generally face toward the vehicle surface 322 to protect the covers 364 and the lamps 352. Moreover, a latching mechanism (not shown) may be used to permit rotational positioning of the light bar 332 at any one of a number of rotational positions. In such a situation, for example, lamps 352 may be focused to light up terrain closer to the vehicle 20 in one orientation than in another orientation where the lights focus on the terrain further ahead of the direction of vehicle travel. In one possible embodiment, the pivoting mechanism may beautomated so that when a switch is operated to activate the lamps 352, they rotate into an operational position, the same switch or another switch may be used to customize the actual rotational orientation of the lamps 352 associated with the light bar 332.

As described, an assembly, such as the low profile light assembly 26, provides an integrated housing 38 and light sources 52, which reduces manufacturing costs and decreases the number of exterior parts that are susceptible to damage on the exterior surface 22 of the vehicle 20. Moreover, the low profile light assembly 26 provides a light source 52 on the exterior surface 22 of the vehicle 20 that is low enough to the exterior surface 22 as not to be exposed to damage in low clearance situations such as low clearance parking structures and the like.

In other embodiments, the low profile light assembly 26 may be disposed inside a channel of an article carrier rail extending along at least a portion of a vehicle surface such as a truck bed. The article carrier rail may be same channel that is used to receive traditional fasteners for securing items, the light bar 32 outside surface 46 being such that it does not hinder operation of the traditional fasteners disposed within the channel. At the same time, however, light assembly 26 is protected from accidental contact and resulting damage.

The ability to protect lamps 52 is particularly important in the illustrated embodiment, the surface is a vehicle bed 30 such as that found in a pickup truck. For example, if crates or barrels are placed in the vehicle bed, they may become jostled, contacting the article carrier rail. As the light assembly 26 has lamps 52 that are retained within the channel of the rail, the legs of the rail may protect the light bar 32 from damage. Moreover, at the same time, electrical connectors are protected from environmental impact and from site. Additionally, the lamps 52 are hidden from general view until activated.

In one aspect, each lamp 52 includes a plurality of embedded diffusion particles. The diffusion particles include groups of LEDs 58 for lighting selected segments of the light bar assembly 26 for providing a working light in a vehicle bed.

Optionally, color filters or color pigment may also be added atop or to the diffuser material to provide for colored effect. Alternatively, a colored effect can be created by using colored LEDs 58.

The red LEDs 58 in the housing 38 are illuminated to perform a rear tail light function. The rear tail light function preferably meets or exceeds the requirements in SAE standard J585 "Tail Lamps (Rear Position Lamps) For Use on Motor Vehicles Less Than 3890 mm in Overall Width." All of the red LEDs 58 are illuminated to perform a brake light function. The brake light function preferably meets or exceeds the requirements in SAE standard J586 "Stop Lamps for Use on Motor Vehicles Less Than 3890 mm in Overall Width." The low profile light assembly 26 may include LEDs 58 arranged to form an array. The LEDs 58 may be mounted to a printed circuit board (PCB) and includes LEDs 58 that emit red light (i.e., red LEDs). However, the cover 64 may be red and the LEDs 58 may emit white light.

Figure 11:
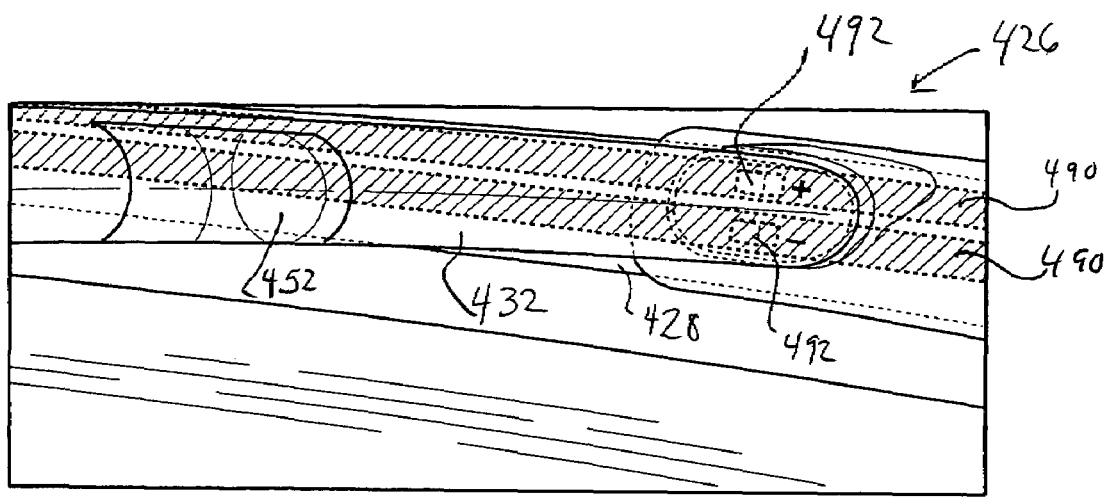
FIG. 11 is a partial phantom view a low profile light assembly according to an embodiment, illustrating two connectors at each end of the housing adapted to selectively engage two electrical strips in a side rail.
Figure 12:
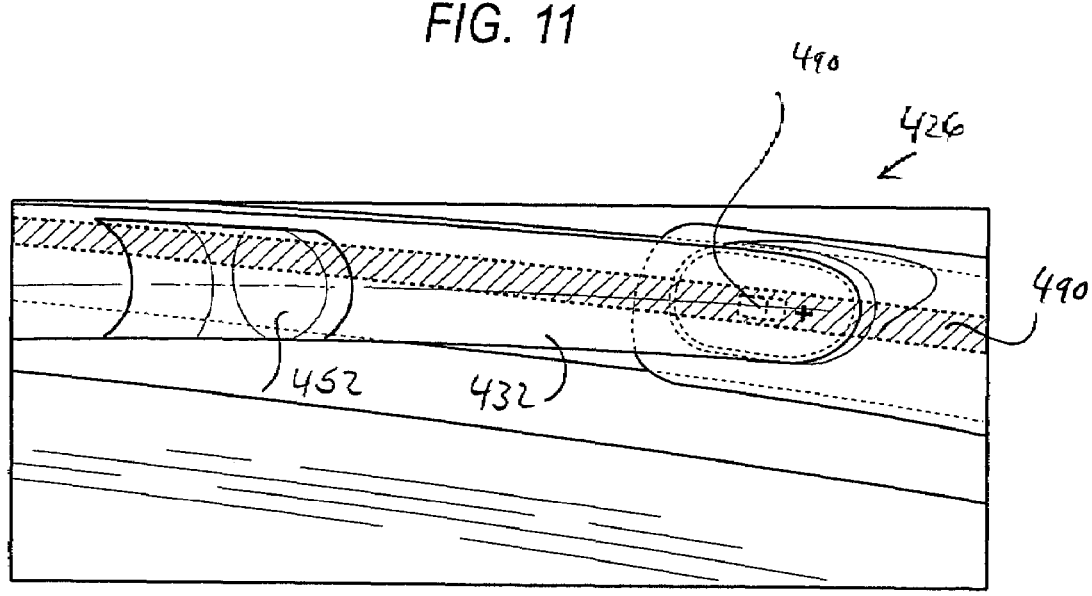
FIG. 12 is a partial phantom view a low profile light assembly according to an embodiment, illustrating a connector at each end of the housing adapted to selectively engage an associated electrical strip in the side rail.

FIG. 11 illustrates a light bar assembly 426 wherein the side rails include electrical strips 490 that electrically engage mating electrical connectors 490 associated with the light bar 432 so that lamps 452 may be operated even though the light bar 432 may move to different positions (in the directions of arrows 3 and 4 of FIG. 1) along the side rails 428, 430. The first end 440 of the light bar 432 engages a channel 494 the side rail 428. The side rail 428 includes two electrical connectors 492 that electrically engage two separated strips 492 of electrically conductive material such as an aluminum or copper alloy, the two strips 492 extend within the channel 494 of the side rail 428. In another possible embodiment as shown in FIG. 12, only one strip 496 is associated with each side rail 428, 430, each opposing end of a cross rail having its own connector, such as the connector 490. The latter embodiment may be preferable in some circumstances to separate the connectors 490 from accidental touching by a user even under highly unusual circumstances.

Each connector 492 connects to a different strip 490, the strips 490 typically having positive and negative charge when light assembly 426 is operated for illumination. In turn, each strip 490 may be connected to wiring (not shown) that preferably goes through a stanchion (not shown in FIGS. 11 and 12) that is typically disposed between a side rail 428 and a vehicle surface 422 and into the interior of the vehicle 420. In turn, once the wiring is within the vehicle cabin structure, it may be connected to the vehicle's wiring system and a switch as is well known in the art. As a result, the lights are highly adaptable to different orientations along side rails, but the electrical connectors are protected from the elements and remain out of site.

Referring now to FIGS. 14-18, one embodiment of the low profile light assembly 26 is shown having marker lights 556. The profile light assembly 526 is integrated and mounted onto the vehicle 520 on exterior surface 522. In the illustrated embodiment, the low profile light assembly 526 is configured to function as a marker light system. In another embodiment, the low profile light assembly 526 is configured to function as a spotlight system. It is important to note, however, that any type of lamp or lighting configuration may be utilized with the low profile light assembly 526 and is not limited to those configurations described herein, and that the housing 538 may be mounted to any suitable exterior surface of any vehicle.

Regardless of the light system employed, the low profile light assembly can maintain the same basic components, whether the lamps are spotlights, markers, or the like.

A light assembly, such as the low profile light assembly 526 may be operated as a brake light and include a conventional brake system equipped with a brake pedal, a brake light actuator, and rear brake lights, mounted to the rear end of the vehicle 520. The low profile light assembly 526 may be located at the rear end of a vehicle 520 functioning in concert with the vehicle rear brake lights. As is conventional in the automotive field, when the brake pedal is depressed by a driver, the brake light actuator activates the rear brake lights to indicate the actuation of the brake system. The light assembly 526 functions as a brake indicator light having groups of LEDs 558 for lighting.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. An article carrier apparatus for a vehicle comprising:
   a cross rail interconnected to an exterior surface of the vehicle;
   a heat sink positioned within the cross rail;
   a light source positioned within the cross rail and thermally connected to the heat sink such that the heat sink will absorb at least a portion of the heat generated by operation of the light source; and
   at least one reflector, wherein at least a portion of the light source is positioned within the reflector, wherein the cross rail will structurally support an article attached to the exterior of a vehicle.

2. The apparatus of claim 1, wherein the heat sink material has the thermal conductivity of at least aluminum.

3. The apparatus of claim 1, wherein said light source includes at least one LED.

4. The apparatus of claim 1, wherein the light source produces at least 5,000 lumens.

5. The apparatus of claim 1, wherein the light source produces at least 15,000 lumens.

6. The apparatus of claim 1, wherein the heat sink is connected to a first side rail and a second side rail so as to selectively structurally support an article.

7. The apparatus of claim 1, further comprising at least 12 sources of light wherein the heat sink thermally interconnects the at least 12 sources of light.

8. The apparatus of claim 1, wherein the heat sink includes a plurality of heat dissipating fins to dissipate heat.

9. The apparatus of claim 1, wherein the reflector is connected to the heat sink with a thermally conductive adhesive.

10. An article carrier apparatus for a vehicle comprising:
    a cross rail interconnected to an exterior surface of the vehicle;
    a heat sink positioned within the cross rail; and
    a light source positioned within the cross rail and thermally connected to the heat sink such that the heat sink will absorb at least a portion of the heat generated by operation of the light source,
    wherein the cross rail will structurally support an article attached to the exterior of a vehicle.

11. The apparatus of claim 10, further comprising at least one reflector, wherein at least a portion of the light source is positioned within the reflector, and the reflector is connected to the heat sink with a thermal based epoxy.

12. The apparatus of claim 10, wherein said light source includes at least one LED.

13. The apparatus of claim 10, wherein the light source produces at least 5,000 lumens.

14. The apparatus of claim 10, the cross rail includes a sleeve for protecting the light source.

15. The apparatus of claim 10, wherein the heat sink material has the thermal conductivity of at least aluminum.

16. The apparatus of claim 10, further comprising at least 12 sources of light wherein the heat sink thermally interconnects the at least 12 sources of light.

17. The apparatus of claim 10, wherein the heat sink is connected to a first side rail and a second side rail so as to selectively structurally support an article.

18. An article carrier apparatus for a vehicle comprising:
    a cross rail interconnected to an exterior surface of the vehicle;
    a heat sink positioned within the cross rail; and
    a light source positioned within the cross rail and thermally connected to the heat sink such that the heat sink will absorb at least a portion of the heat generated by operation of the light source; and
    at least one reflector, wherein at least a portion of the light source is positioned within the reflector, and the reflector is connected to the heat sink with a thermal based epoxy, wherein the cross rail will structurally support an article attached to the exterior of a vehicle.

19. The apparatus of claim 10, wherein the light source produces at least 5,000 lumens.

20. The apparatus of claim 10, wherein the cross rail is sealed to prevent inleakage of water.

* * * * *